(12) United States Patent
Dell'Acqua et al.

(10) Patent No.: US 11,478,776 B2
(45) Date of Patent: Oct. 25, 2022

(54) METHOD FOR SOLVENT RECOVERY AND ACTIVATED CARBON REGENERATION

(71) Applicant: Donau Carbon Technologies S.r.l., Guanzate (IT)

(72) Inventors: Giuseppe Dell'Acqua, Guanzate (IT); Veronica Dell'Acqua, Guanzate (IT)

(73) Assignee: Donau Carbon Technologies S.r.l., Guanzate (IT)

(*) Notice: Subject to any disclaimer, the term of this patent is extended or adjusted under 35 U.S.C. 154(b) by 252 days.

(21) Appl. No.: 16/754,559

(22) PCT Filed: Nov. 3, 2017

(86) PCT No.: PCT/EP2017/078253
§ 371 (c)(1),
(2) Date: Apr. 8, 2020

(87) PCT Pub. No.: WO2019/086128
PCT Pub. Date: May 9, 2019

(65) Prior Publication Data
US 2020/0254423 A1 Aug. 13, 2020

(51) Int. Cl.
*B01D 53/04* (2006.01)
*B01J 20/34* (2006.01)
*B01J 20/20* (2006.01)

(52) U.S. Cl.
CPC ...... *B01J 20/3483* (2013.01); *B01D 53/0423* (2013.01); *B01D 53/0438* (2013.01); *B01D 53/0446* (2013.01); *B01J 20/20* (2013.01); *B01J 20/3416* (2013.01); *B01J 20/3491* (2013.01); *B01D 2253/102* (2013.01);
(Continued)

(58) Field of Classification Search
CPC ............. B01D 53/04; B01D 53/0423; B01D 53/0438; B01D 53/0446; B01D 53/0454; B01D 2253/102; B01D 2257/704; B01D 2257/708; B01D 2258/06; B01D 2259/4009; B01J 2259/401; B01D 2259/403; B01J 20/20; B01J 20/3416; B01J 20/3483; B01J 20/3491; B01J 2204/007; B01J 2220/56
USPC ..... 95/96, 97, 102, 104, 106, 114, 115, 143, 95/148; 96/143, 144, 146
See application file for complete search history.

(56) References Cited

U.S. PATENT DOCUMENTS

| | | | |
|---|---|---|---|
| 4,986,836 A * | 1/1991 | Tandon | B01D 53/0454 96/111 |
| 5,230,872 A | 7/1993 | Tiggelbeck et al. | |

(Continued)

FOREIGN PATENT DOCUMENTS

| | | |
|---|---|---|
| EP | 0022315 | 1/1981 |
| EP | 1 510 243 | 3/2005 |
| JP | 5318504 | 2/1978 |

OTHER PUBLICATIONS

International Search report and written opinion issued by the EPO dated Nov. 26, 2018 for PCT/EP2017/078253.
(Continued)

*Primary Examiner* — Frank M Lawrence, Jr.
(74) *Attorney, Agent, or Firm* — Silvia Salvadori

(57) ABSTRACT

An activated carbon device for adsorbing solvent from a flow of air is regenerated by feeding heated inert gas to the activated carbon and by applying a reduced pressure to the heated activated carbon.

11 Claims, 6 Drawing Sheets

(52) U.S. Cl.
CPC .......... *B01D 2257/704* (2013.01); *B01D 2259/401* (2013.01); *B01D 2259/403* (2013.01); *B01D 2259/4009* (2013.01); *B01J 2220/56* (2013.01)

(56) References Cited

U.S. PATENT DOCUMENTS

| | | | | |
|---|---|---|---|---|
| 5,542,965 | A | * | 8/1996 | Straubinger ....... B01D 53/0454 95/14 |
| 5,846,295 | A | * | 12/1998 | Kalbassi ............. F25J 3/04157 95/105 |
| 6,066,192 | A | * | 5/2000 | Toshinaga .......... B01D 53/0431 95/93 |

OTHER PUBLICATIONS

Nastaj J F et al: "Simulation studies of a vacuum and temperature swing adsorption process for the removal of VOC from waste air streams", International Communications in Heat and Mass Transfer, Pergamon, New York, NY, US, vol. 33, No. 1, Sep. 7, 2005 (Sep. 7, 2005).

Seo-Hyun Pak et al: "Effect of vacuum regeneration of activated carbon on volatile organic compound adsorption", Environmental Engineering Research, vol. 22, No. 2, Nov. 30, 2016 (Nov. 30, 2016).

* cited by examiner

METHOD FOR SOLVENT RECOVERY AND ACTIVATED CARBON REGENERATION

This application is a U.S. national stage of PCT/EP2017/078253 filed on 3 Nov. 2017, the content of which is incorporated herein by reference in its entirety.

FIELD OF THE INVENTION

The present invention relates to the field of solvent recovery. In particular, the present invention relates to the field of recovery of solvents from activated carbon, wherein the solvent to be recovered is adsorbed.

BACKGROUND OF THE INVENTION

Printing on plastic films presents different kind of problems that do not affect printing on paper and other absorbent media Inks for plastic printing should be formulated to adhere to smooth and impenetrable surfaces and, in some cases, pre-treatments are requested. In addition, it is often required that the ink is shiny, flexible, dry and heat-resistant and above all that it does not contain species that can migrate through the plastic support and risk altering the contents of the packaging.

The rules that limit the emissions of pollutants into the atmosphere have led to an analysis of the possibility of using water inks or water-alcohol ink mixtures in printing processes.

Unfortunately, the high speeds achieved in flexible packaging printing, both with rotogravure technology (about 200-300 m/min) and flexography (about 100-150 m/min), which are the known and most commonly used printing techniques, make it difficult to use a slow evaporation solvent like water.

However, the printing processes (e.g. rotogravure printing and flexographic printing) require, for efficient ad high quality performances, the use of solvents in inks, such as ethyl acetate or alcohol/ethyl acetate mixtures, thus generating the need of their handling, in line with environment regulations.

In fact, many solvents, identified as "VOCs", i.e. "Volatile Organic Carbon", show high volatility, environmental persistence and toxicity, with important impact from the environmental point of view.

The use of activated carbon to purify polluted air containing VOCs coming, e.g., from rotogravure printing or flexographic printing plants is well known and applied.

Activated carbon filtration is an air purification technology through which a gaseous stream is cleaned by polluting elements with a filter containing activated carbon, namely activated carbon. The filtration is based on the ability of the activated carbon to absorb most of the organic matter, and the possibility to extract it, i.e., to desorb it from the activated carbon, for example by using vapor or nitrogen. The activated carbon is in the form of particles essentially composed of carbon atoms, of vegetable or mineral origin, and it is characterized by an extremely high porosity.

The polluted air, i.e. air containing one or more solvents, passes through the activated carbon; in this way, the solvents (VOCs) contained in the air stream are adsorbed by the porous structure of the activated carbon. Once the activated carbon is saturated with VOCs (for example, ethyl acetate and isopropyl alcohol) a regeneration step of the activated carbon itself has to be carried out. The wording "activated carbon regeneration means that the VOCs, previously adsorbed onto the activated carbon, are extracted from the carbon in order to re-use the carbon for another absorbing step. These processes are discontinuous: each absorbing step is followed by at least one de-absorbing (or desorbing) step.

Several technologies for regeneration of activated carbon in a process of cleaning solvent-laden air are known.

For example, it is known that solvent recovery from activated carbon may be performed by using inert gas (nitrogen, $N_2$), steam or vacuum for activated carbon regeneration. In other words, methods are known wherein, inert gas (nitrogen, $N_2$), steam or vacuum are used to remove the solvent from the activated carbon; the removed solvent is subsequently recovered to be re-used in industrial processes, e.g. printing processes.

The selection of the technological solution to be adopted for the air cleaning, may depend on the amount (in particular on the flow rate) of polluted air to be treated.

In general, Regenerative Thermal Oxidizer (RTO), which is a system that uses a bed of ceramic material to absorb heat from the exhaust gas, is a flexible and substantially cheap solution for the cleaning of polluted air, but it does not allow the recovery of the solvent.

Conversely, the known activated carbon solvent recovery systems allow the recovery of the solvent which is removed from the activated carbon during the regeneration step, but such systems are much more expensive than RTO devices/plants.

Generally, there should be at least 1000 ton/Y (tons per year) of polluted air to be treated, and high amounts of solvents to be recovered, to justify, in terms of cost and efficiency, a "Solvent Recovery equipment" instead of a "Regenerative Thermal Oxidizer (RTO) equipment". Also, a Solvent Recovery equipment request an important range of investments, and are characterized by very large size plants which normally request also infrastructural intervention for their installation and implementation phases.

Additionally, also vacuum regeneration systems are quite expensive and with a low rate of efficiency. Generally, this kind of solution is suitable for quite low polluted air flow rate (e.g., less than 5000 $Nm^3/h$). For example, vacuum technology is used in the field of oil and gas, for benzene vapor carbon desorption, wherein the concentration of solvent is about 100 times higher than in the field of flexible packaging printing (e.g. about 300-600 $g/m^3$ benzene concentration against about 3 $g/m^3$ solvent concentration).

Nowadays, a Solvent Recovery Plant with nitrogen/steam regeneration of the activated carbon is a suitable solution only for printing companies using rotogravure machines, which uses huge quantity of solvent in production process. Because of the process complexity, high costs for utilities and complexity of the installation, Solvent Recovery Plants construction and operation costs became affordable when high quantity of solvent are recovered and reused in printing process.

Thermal Oxidizers (RTO) are widely used in flexographic printing, but they do not allow the recovery of solvents from the activated carbon and, since lower solvent concentration (if compared to solvent concentration used in rotogravure printing processes) makes Solvent Recovery Plants with nitrogen/steam regeneration of the activated carbon no convenient for use in flexographic printing processes.

SUMMARY OF THE INVENTION

It is an aim of the present invention to solve the above mentioned problems and to provide a method for the regeneration of activated carbon which allows the effective recovery of solvents, and which is environmentally friendly.

Another aim of the present invention, is to provide a method for the regeneration of activated carbon which allows the effective recovery of solvents which can be used when the volume of solvent to be recovered is low.

Still another aim of the present invention is to provide a method for the regeneration of activated carbon which allows the recovery of solvents used in printing processes, e.g., packaging printing processes.

These and other aims are achieved by a method according to the present invention, in which the activated carbon that is containing the solvent is heated without substantial removal of solvent from the carbon solvent and in subsequent step a reduced pressure is applied to the activated carbon so that the solvent is removed from the carbon.

In particular, the present invention refers to a method of regenerating activated carbon and to a process of recovering solvent from process air. Another object of the invention is a plant for removing a solvent from a flow of air. Preferred embodiments are also disclosed.

BRIEF DESCRIPTION OF THE DRAWINGS

Further aspects and advantages of the present invention will be discussed more in detail with reference to the enclosed drawings, given by way of non-limiting example, wherein:

FIG. 3 also shows the temperature and solvent concentration gradients in the bed during the heating step, according to an embodiment of the method of the invention;

DETAILED DESCRIPTION OF THE INVENTION

In the following detailed description, for sake of simplicity, reference will be made to specific components suitable to be used to carry out the method of the invention; however, such reference to specific components has to be intended as merely illustrative of possible embodiments, and as non-limiting of the scope of the invention.

During a solvent adsorbing step, a flow of air that contains solvent is passed through activated carbon, so that the solvent contained in the air is adsorbed on said activated carbon.

According to embodiments, the activated carbon are arranged in a solvent adsorbing device as a bed of activated carbon. During the solvent adsorbing step, the bed of activated carbon is gradually saturated by the adsorbed solvent. When the saturation of the bed of activated carbon is between 60% and 80%, preferably about 70%, the step of regeneration of the activated carbon is started.

Methods and devices for determining the saturation of the bed of activated carbon are known in the art and are not part of the invention. Suitable methods and devices include FID analysis equipment.

For example, the step of regeneration of the activated carbon may be started when the concentration of the solvents in the flow of air, after that the flow of air containing solvents (i.e., "polluted" air) has passed through the bed of activated carbon, reaches a pre-determined value.

According to embodiments, as a preliminary step, the oxygen is removed at least from the solvent absorbing device, in order to provide an inert atmosphere within the plant, the solvent adsorbing device and within the bed of activated carbon inert. Advantageously, this preliminary step allows to avoid combustion of the solvent adsorbed within the bed of activated carbon, and thus the combustion of the activated carbon, during the heating step, wherein at least part of the activated carbon are heated to a temperature T2, by a heated inert gas.

Figure 1:
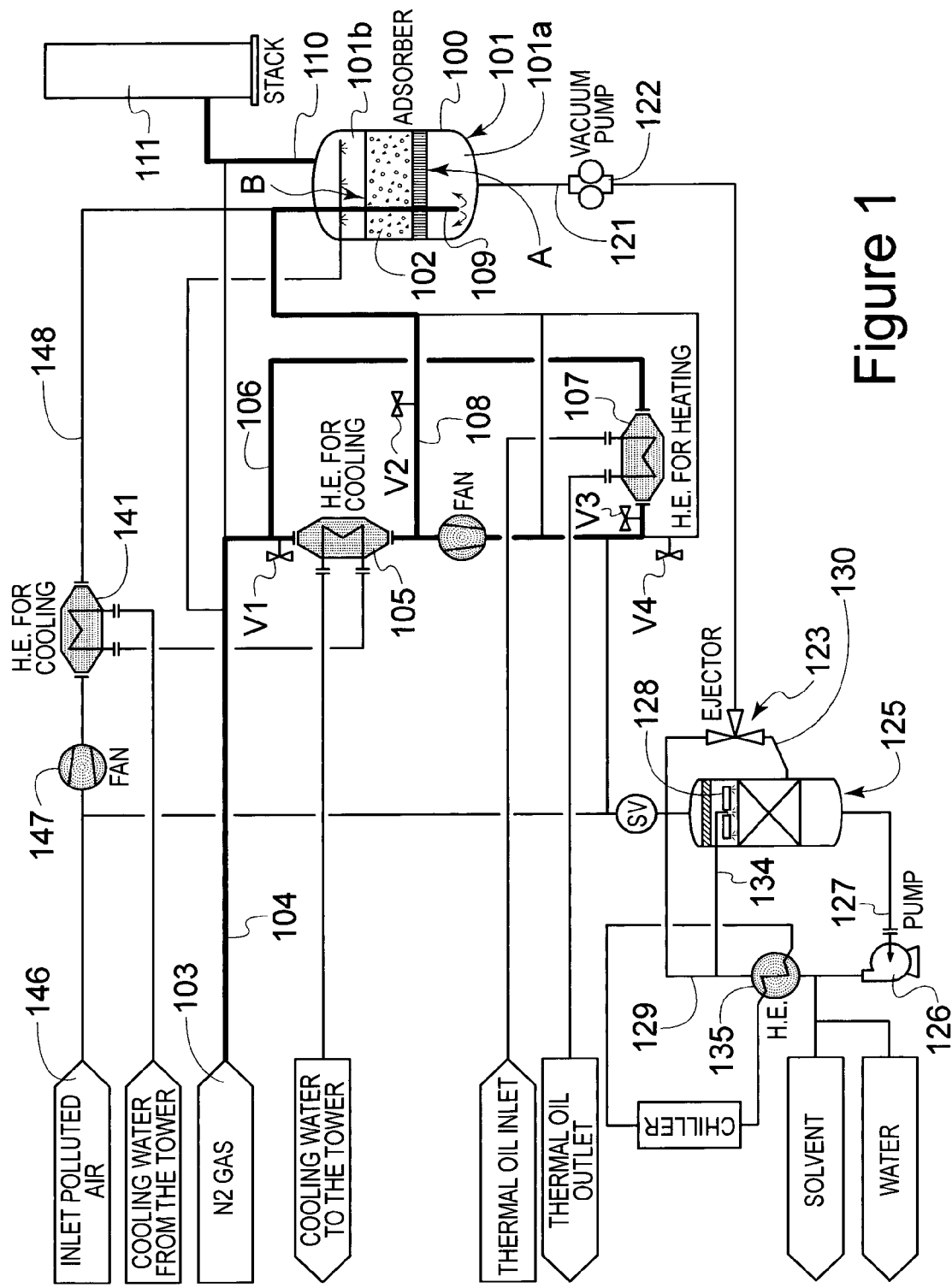
FIG. 1 is a schematic representation of the process flow during the preliminary oxygen removing step, according to an embodiment of the method of the invention.

As above mentioned, FIG. 1 is a schematic representation of the process flow during the preliminary step of oxygen removing, according to an embodiment of the method of the invention. In particular, FIG. 1 shows the flow path of the fluids between the different components of an exemplary embodiment of a plant suitable to perform the method of the present invention, during the preliminary step of oxygen removing.

The plant includes an air inlet 146 to allow air that contains the solvent, coming e.g. from a printing plant as above discussed, to be fed to the plant of the present invention. A fan 147 forwards the polluted air to an adsorbing device 101, which contains activated carbon bed 102, where the solvent is adsorbed. In the shown embodiment, there are provided several heat exchangers, 141, 105, 107, 135, to control the temperature of the air, of the inert gas, and of the mixture of inert gas and solvent which is removed from the adsorber device 101, respectively.

Heat exchanger 141 is connected with conduit 148, feeding polluted air to the adsorber 101, which is provided with an outlet in portion 101b; portion 101b is connected to conduit 110, which extends to a stack, or chimney, 111. Adsorber (i.e. the adsorbing device) 101 comprises a container 100 and a bed of activated carbon 102 having a first side A and a second side B. Conduit 148 extends through bed 102 and projects from side A of the bed 102 with conduit 109, into first portion 101a (which in FIG. 1 is the "lower" or "bottom" portion of the adsorber) of the solvent adsorbing device 101. The air coming from conduit 109 is directed against the wall of container 100, which acts as a diffuser (in a way known per se) to send in a more uniform way the air to side A of bed 102.

The air that contains the solvent passes through bed 102, from first portion 101a to second portion 101b of device 101, so that the solvent contained in the air is adsorbed into the activated carbon bed 102. Accordingly, in the embodiment of FIG. 1, the air which enters into the activated carbon bed 102 from the first portion 101a of device 101 contains the solvent, whilst the air which exits from side B of activated carbon bed 102, in the second portion 101b of device 101, is free or substantially free of solvent. With the wording "free or substantially free" it is meant that the residual content of solvent in the air leaving the adsorbing device is either not detectable or is negligible, i.e. a content that is preferably lower than 10 mg/Nm$^3$.

Portion 101a of device 101 is connected with conduit 121 to a source of reduced pressure; in the shown embodiment the source of reduced pressure comprises a vacuum pump 122 and an ejector 123; however, any means suitable to providing vacuum or producing a reduced pressure may be used. Ejector 123 is connected by conduit 130 to a solvent recovering column 125; column 125 is connected via conduit 127 to pump 126 and to a heat exchanger 135. Duct 129 connects heat exchanger 135 to ejector 123; a conduit 134 connects conduit 129 to nozzles 128, to spray liquid and cold solvent inside column 125. FIG. 1 refers to the preliminary step of removing oxygen from the solvent adsorbing device 101 (also indicated in FIG. 1 as "adsorber") and from the bed of activated carbon 102.

The solvent adsorbent device 101, before the regeneration step, contains activated carbon, i.e., a bed of activated carbon 102, wherein significant quantities of "adsorbate", usually a solvent, or a mixture of solvents, have been adsorbed during solvent adsorbing step. During the adsorbing step the air that contains the solvent, coming e.g. from a printing plant, is fed to the plant of the present invention through an air inlet 146 and directed by fan 147 to device 101 where solvent is adsorbed on activated carbon bed 102. In the shown embodiment, the polluted air is passed through a heat exchanger 141. The air that contains the solvent passes through conduit 148 and conduit 109, and it is released into the solvent adsorbing device 101, in particular into first portion 101a (represented in FIG. 1 as the "lower" or "bottom" portion of the solvent adsorbing device 101) of the solvent adsorbing device 101. The air that contains the solvent passes through the activated carbon bed 102, from first portion 101a to second portion 101b of device 101, so that the solvent contained in the air is adsorbed into the activated carbon bed 102.

Accordingly, in the embodiment of FIG. 1, the air which enters into the activated carbon bed 102 from the first portion 101a of device 101 contains the solvent, whilst the air which exits from the activated carbon bed 102 in the second portion 101b of device 101 is free, or substantially free, of solvent. The step of adsorbing solvent is preferably terminated before the activated carbon is saturated, preferably the adsorbing step is terminated when the amount of adsorbed solvent is at about 70-80% of the total possible adsorbed solvent. At the end of solvent adsorbing step, the feed of solvent-containing air to be treated is stopped, and the activated carbon regenerating step is started.

As above mentioned, according to preferred embodiments, the oxygen is removed by expelling air at least from the solvent absorbing device, as a preliminary step in order to make inert the atmosphere inside the solvent absorbing device and within the plant. To remove the oxygen (i.e., remove the air) from the solvent adsorbent device 101, an inert gas, such as gaseous nitrogen ($N_2$), is delivered to device 101. In the shown embodiment, an inert gas coming from an inert gas source 103, namely nitrogen gas, passes through a conduit 104 and a first heat exchanger 105. A part of the inert gas passing through conduit 104 is deviated into conduit 106 and delivered to a second heat exchanger 107.

The inert gas exiting from the first heat exchanger for cooling 105 and the inert gas exiting from the second heat exchanger for heating 107 are admixed, and delivered into conduit 108 and then into conduit 109, which releases the inert gas into the solvent adsorbing device 101.

According to embodiments, during the oxygen removing step (or "inertising step"), valves V1, V2 and V3 are open, whilst valve V4 is closed.

During this step, the first heat exchanger 105 and the second heat exchanger 107 do not cool or heat the inert gas passing through them.

In the embodiment of FIG. 1, conduit 109 passes through the bed of activated carbon 102, to reach a first portion 101a (represented in FIG. 1 as the "lower" portion of the adsorber 101) of the solvent adsorbing device 101, where the inert gas is released, i.e., exits from conduit 109 on side A of the carbon bed 102.

According to embodiments, the first portion 101a and the second portion 101b of adsorber 101 are separated by the bed of activated carbon 102, i.e., the first portion 101a and the second portion 101b are on opposite sides with respect to the bed of activated carbon 102.

For sake of simplicity, reference is made to a solvent adsorbing device which is arranged in vertical position, which is a preferred arrangement of the device 101; however, the method of the present invention may be performed also using a solvent adsorbent device arranged horizontally.

The inert gas exiting conduit 109 into the solvent adsorbing device 101, namely in the first portion 101a of the solvent adsorbing device 101, passes through the bed of activated carbon 102, in this case, in a direction from the first portion 101a (the "lower" portion) to the second portion 101b (the "upper" portion) of the solvent adsorbing device 101, i.e. from side A to side B of bed 102; and exits from the solvent adsorbing device 101. The inert gas exiting from the solvent adsorbing device 101, is delivered by conduit 110 to stack 111.

According to embodiments, the inert gas passes through the bed of activated carbon 102, during the oxygen removing step, in same direction in which the flow of air that contains solvent passes through the bed of activated carbon 102 during the solvent adsorbing step.

According to embodiments, the solvent-containing air, as well as the flow of inert gas, pass through the bed of activated carbon 102, along a direction from the first portion 101a (e.g., the "lower" or "bottom" portion) to the second portion 101b (e.g., the "upper" or "top" portion) of the solvent adsorbing device 101.

When the air, i.e., the oxygen, is removed at least from the solvent absorbing device 101 and the atmosphere inside the plant and device 101 and throughout the bed of activated carbon 102 has become inert, the heating step of the regeneration process of the activated carbon is started.

The heating of the bed of activated carbon 102, to a temperature T2, is carried out at least in part by a flow of heated inert gas, preferably heated nitrogen ($N_2$). Temperature T2 is low enough to avoid removing substantial amounts of solvent from the carbon bed; preferably, temperature T2 on side A of the carbon bed is low enough to avoid solvent being removed from carbon bed 102 at the pressure that is present in the adsorber during the heating step.

Figure 2:
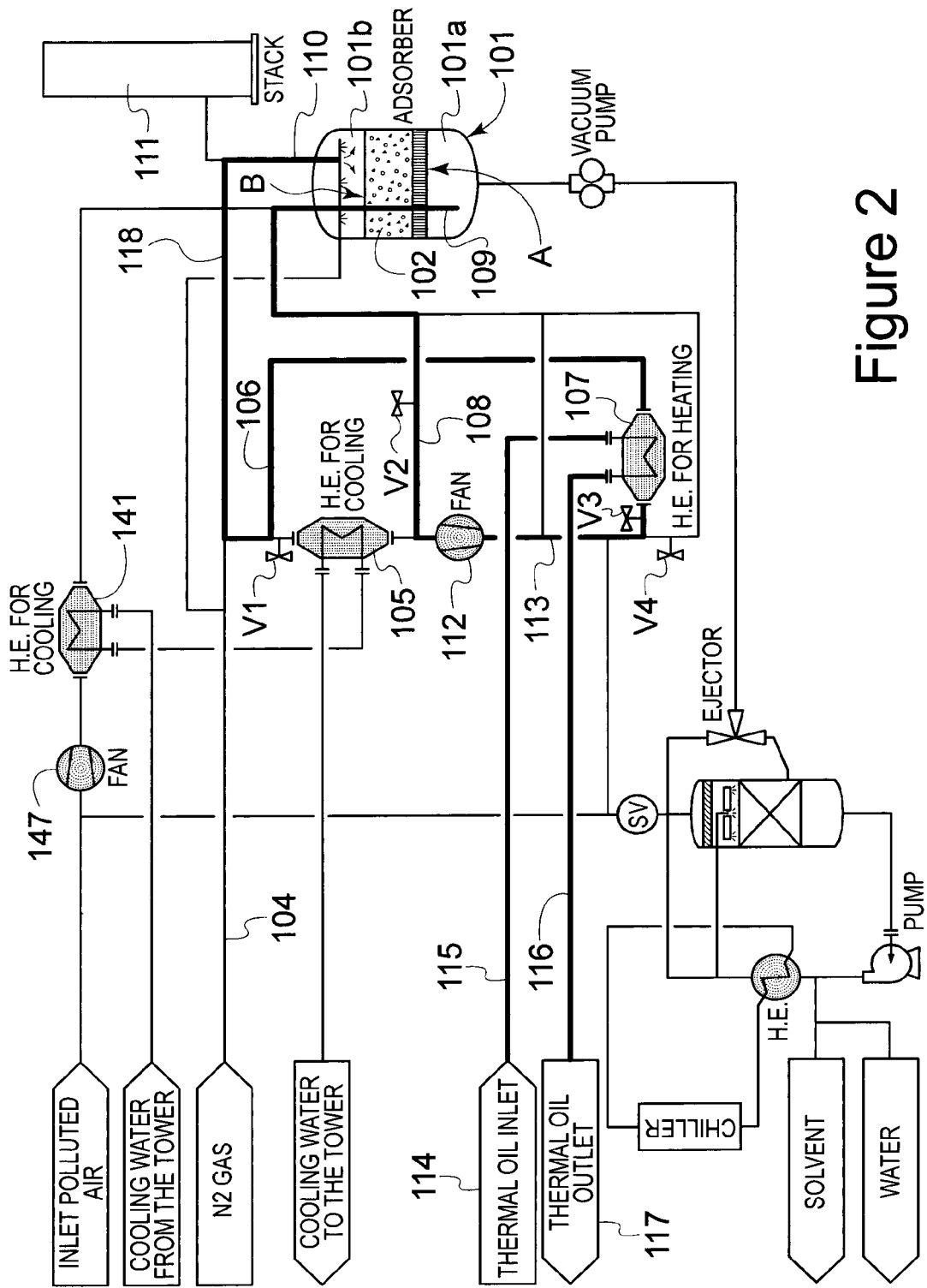
FIG. 2 is a schematic representation of the process flow during the step of heating the activated carbon according to an embodiment of the method of the invention.

With reference to the embodiment of FIG. 2, the heating of the bed of activated carbon 102 is carried out according to a closed-loop process. In other words, the inert gas, which has been introduced into the solvent absorbing device 101 during the oxygen removing step of the method, is heated and re-cycled, to heat the activated carbon, up to a predetermined temperature. Accordingly, during the heating step no additional inert gas is provided.

FIG. 2 shows the flow path of the fluids between the different components of an exemplary embodiment of a plant suitable to perform the method of the present invention, during the step of heating the activated carbon.

During the heating step, the inert gas that is inside the solvent absorbing device 101 is circulated into conduit 109 and conduit 108 by means of a fan 112. From the fan 112, the inert gas is delivered to heat exchanger 107, by passing through conduit 113. According to embodiments, during the heating step, valves V2 and V3 are open, whilst valves V1 and V4 are closed.

The inert gas is circulated to the heat exchanger for heating 107 to increase the gas temperature to temperature T1 and from the heat exchanger for heating 107 to the bed of activated carbon 102, wherein at least some of the carbon will reach temperature T2, wherein T1>T2 (i.e. T1 is higher than T2).

Temperature T1 is preferably ranging from 130° C. to 170° C., more preferably ranging from 130° C. to 160° C. The heat exchanger for heating 107 is, according to the embodiment of FIG. 2, a thermal oil heat exchanger. Thermal oil from a thermal oil inlet 114 is delivered to the heat exchanger for heating 107 through conduit 115.

Thermal energy is transferred from thermal oil to the inert gas, so that the temperature of the inert gas passing through the heat exchanger for heating 107 increases to temperature T1, preferably ranging from 130° C. to 170° C., more preferably ranging from 130° C. to 160° C.

The thermal oil, after that the thermal energy has been transferred to the inert gas, exits the heat exchanger 107, and is delivered to a thermal oil outlet 117, through conduit 116.

The hot inert gas exiting the heat exchanger 107 is delivered to the solvent absorbing device 101 through conduit 106 and conduit 118, and enters into the solvent absorbing device 101 through conduit 110.

In the heating step, the inert gas enter into the solvent adsorbing device 101, from the second portion 101b (represented in FIG. 2 as the "upper" portion of the solvent adsorbing device 101), and passes through the bed of activated carbon 102, to reach a first portion 101a (represented in FIG. 2 as the "lower" portion of the solvent adsorbing device 101) of the solvent adsorbing device 101, increasing the temperature of the activated carbon, e.g., to a temperature T2, which is lower that the temperature T1 of the heated inert gas. According to embodiments, temperature T2 is lower than the boiling point of the solvent at the pressure P of the heating step and is higher than the boiling temperature of the solvent adsorbed within the bed of activated carbon 102 when a reduced pressure is applied to the adsorbing device.

According to the embodiment of FIG. 2, in the heating step, the heated inert gas passes through the bed of activated carbon 102 along a direction from the second portion 101b (represented in FIG. 2 as the "upper" portion of the solvent adsorbing device 101) to first portion 101a (represented in FIG. 2 as the "lower" portion of the solvent adsorbing device 101) of the solvent adsorbing device 101, i.e., in a direction that is opposite (i.e., in "counter-current") to the direction of the solvent-containing air during the solvent adsorbing step.

According to embodiments, during the solvent adsorbing step, the solvent-containing air passes through the bed of activated carbon 102, along a direction from the first portion 101a (e.g., the lower portion) to the second portion 101b (e.g., the upper portion) of the solvent adsorbing device 101 and, during the heating step, the heated inert gas passes through the bed of activated carbon 102 along a direction from the second portion 101b to the first portion 101a of the solvent adsorbing device 101.

According to embodiments, the heating of the activated carbon (and of the solvent adsorbed thereon) is carried out by using a heated inert gas, such as nitrogen, at a temperature preferably ranging from 130° C. to 170° C., more preferably ranging from 130° C. to 160° C., which flows through the bed of activated carbon in "counter-current" with respect to the flow of solvent-containing air during the solvent adsorbing step (and also with respect to the inert gas during the oxygen removing step). In an exemplary embodiment, when gaseous nitrogen is used as inert gas, the gaseous nitrogen, preferably, is pure at 99.9%, the speed of the flow of gaseous nitrogen inside the bed of activated carbon is in the range of 0.23÷0.35 m/s, the residence time of the gaseous nitrogen in the bed of activated carbon is more than 4 s and the gaseous nitrogen flow rate is in the range of 4000÷6000 Nm$^3$/h.

The heating step above discussed, with reference to FIG. 2, may be continued, preferably in closed loop, in order to heat the activated carbon to a pre-selected temperature.

In other words, the heated inert gas may be circulated from the bed of activated carbon 102 to the heat exchanger 107, to increase the temperature of the inert gas, and from said heat exchanger 107 to said bed of activated carbon 102 to increase the temperature of the carbon, and then again from the bed of activated carbon 102 to the heat exchanger 107, for another cycle of heating of the inert gas and heating of activated carbon.

As above mentioned, temperature T1 of the heated inert gas is selected in order to move the solvent adsorbed onto the activated carbon from second side B to first side A of bed 102, to provide a concentration of solvent at side A of the carbon bed. Advantageously, when the flow of heated inert gas through the bed of activated carbon is in "counter-current" with respect to the flow of the solvent-containing air during the solvent adsorbing step, a solvent concentration gradient, and a temperature gradient, are generated throughout the bed of activated carbon.

Without being bound to a specific explanation, it has been observed that, when the flow of heated inert gas through the bed of activated carbon is in "counter-current" with respect to the flow of the solvent-containing air during the solvent adsorbing step, the solvent is moved by the flow of hot gas from side B to side A, through the activated carbon bed, along the direction on the heated inert gas flow, so that a solvent concentration gradient is obtained. In particular, a solvent concentration gradient is generated so that the concentration of the solvent in the bed of activated carbon is higher on the side of the bed of activated carbon from which the heated inert gas exits from the bed. In other words, the concentration of the solvent in the bed of activated carbon is higher on the side of the bed of activated carbon that is contacted first by the solvent-containing air during the solvent-adsorbing step. This side is also the side where vacuum is applied, as disclosed in then following description.

Also, a temperature gradient is generated, so that the temperature of the bed of activated carbon is higher on the side B of the bed of activated carbon from which the heated inert gas enters into the bed and lower on side A; preferably T2 is the temperature of the carbon bed on side A. In other words, the temperature of the bed of activated carbon is higher on the side B of the bed, which is the side from which the air, exits from bed 102 during the solvent-adsorbing step.

Figure 3:
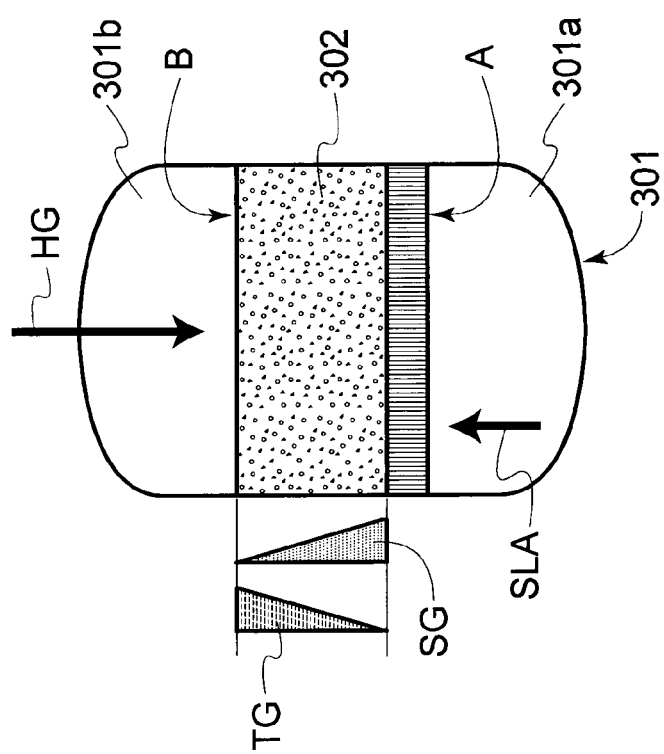
FIG. 3 is a schematic representation of the flow of the solvent containing air and heated inert gas through in a bed of activated carbon inside a solvent adsorbing device.

FIG. 3 schematically represents the flow of the Solvent-Laden-Air SLA and the flow of the heated inert gas HG (e.g., heated nitrogen) that pass through a bed of activated carbon 302 in a solvent adsorbing device 301 according to an embodiment of the present invention; also shown is a scheme of a solvent concentration gradient SG and of a temperature gradient TG obtainable in the heating step according to an embodiment of the method of the invention.

As can be observed in FIG. 3, during the solvent adsorbing step, the solvent-containing air SLA is passed through the bed of activated carbon 302 along a first direction, from a first side A, which faces the first portion 301a of the solvent adsorbing device 301, to a second side B of said bed, which faces the second portion 301b of the solvent adsorbing device 301, and the heated inert gas HG, during the heating step, is passed through the bed of activated carbon 302 along a second direction from said second side B to said first side A, said second direction being opposite to said first direction.

According to embodiments, the flow of heated inert gas HG concentrates adsorbed solvent on the first side A of the bed of activated carbon 302, preferably according to a solvent concentration gradient SG. In particular, the flow of heated inert gas HG concentrates adsorbed solvent from second side B towards the first side A of the bed of activated carbon 302.

In other words, as shown in FIG. 3, the flow of heated inert gas HG generates a solvent concentration gradient SG throughout the bed of activated carbon 302, wherein the solvent concentration decreases from the first side A (wherein the adsorbed solvent is concentrated) to the second side B the bed of activated carbon particles 302.

Accordingly, the heating step may be considered, according to embodiments, as a "pre-regeneration" step, wherein the solvent is moved from second side B (the "upper" part) to first side A (the "lower" or bottom part) of activated carbon bed 302. In fact, without being bound to a specific explanation, it has been observed that, by concentrating the solvent on one of the sides of the activated carbon bed, an increase of the partial pressure of the solvent is obtained, so that the solvent may be easily extracted from the activated carbon bed, for example, during the following vacuum step. Conversely, the flow of heated inert gas HG generates a temperature gradient TG throughout the bed of activated carbon 302, wherein the temperature decreases from the second side B (that is the first side that is contacted by the flow of heated inert gas HG) to the first side A of the bed of activated carbon 302.

According to embodiments, at least during the heating step, the temperature of the first side A of the bed of activated carbon 302 is lower than the temperature of the second side B of the bed.

For example, when the solvent adsorbing device 301 is in vertical position, the first side A of the bed of activated carbon 302 is the "lower" side of the bed, and the second side B is the "upper" side of the bed.

When a temperature in the range of 60° C.-100° C., preferably in the range of 70-90° C., is obtained on the first side A, i.e., on the side where the adsorbed solvent has been concentrated by the flow of heated inert gas HG which can be, for example, the "lower" side, of the bed of activated carbon 302, the heating step ends.

After the activated carbon have achieved the desired temperature, the heating step is terminated, and a "vacuum step" commences. Specifically, a reduced pressure $P_{red}$ is applied to the heated carbon to remove at least part of the solvent from the carbon.

According to embodiments, reduced pressure $P_{red}$ ranges from 0.2 bar to 0.01 bar, preferably from 0.1 bar to 0.05 bar; in embodiments more preferably reduced pressure $P_{red}$ is less than 0.05 bar.

Figure 4:
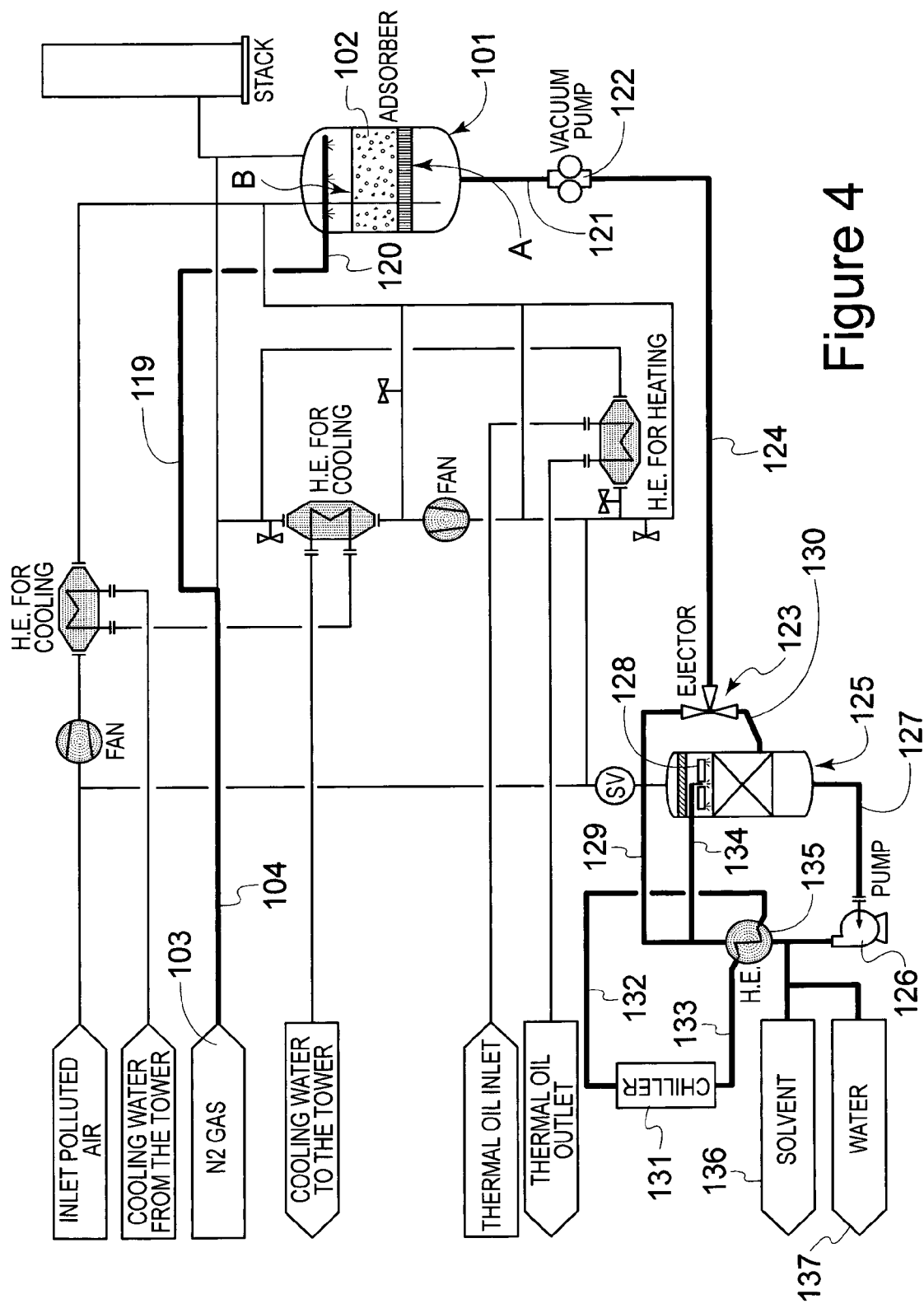
FIG. 4 is a schematic representation of the process flow during the step of pressure reducing in the solvent adsorbing device, according to an embodiment of the method of the invention.

Making reference to the embodiment of FIG. 4, a reduced pressure $P_{red}$ is applied to the heated bed of activated carbon 102 in the solvent adsorbing device 101, to remove at least part of the solvent from the carbon, preferably from the first side A of the heated bed of activated carbon 102, i.e., preferably from the side wherein the solvent has been concentrated during the heating step, as above discussed.

According to embodiments, the reduced pressure $P_{red}$ is applied to the first side A of the bed of activated carbon 102.

According to the embodiment of FIG. 4, the reduced pressure $P_{red}$ is provided by means a source of reduced pressure, e.g. a vacuum group, consisting of two devices in series, i.e. a vacuum pump and an ejector, namely a booster vacuum pump 122, and an ejector 123, which is located downstream with respect to the vacuum pump 122.

The ejector is a static pump, without moving parts. The operating system is based on the Venturi's effect, a jet effect based on Bernoulli's principle. Advantageously, the fluid used to generate the suction effect is the solvent itself, in liquid form.

According to the embodiment of FIG. 4, the vacuum pump 122, which is connected with the solvent adsorbing device 101 through conduit 121, starts extracting, i.e. "desorbing", the solvent from the bed of activated carbon 102, in particular from the first side A of the heated bed of activated carbon 102, wherein the solvent has been concentrated during the heating step, which is, according to the embodiment of FIG. 4, the "lower" side A of the bed of activated carbon 102.

The desorbed solvent passes through conduit 124 and reaches the ejector 123.

Inside the solvent adsorbing device 101, the reduced pressure $P_{red}$ is maintained until the solvent is desorbed from the bed of activated carbon 102, i.e., until the bed of activated carbon 102 is regenerated. A reduced flow of inert gas (e.g., a nitrogen flow) is provided into the solvent adsorbing device 101 during the vacuum step. A suitable reduced flow of nitrogen is a flow that does not prevent removal of the solvent from bed 102, helps the solvent release from carbon flowing to side A of the bed and reduces the partial pressure of solvent in the clean side (top) of carbon bed. Advantageously, by providing a reduced flow of inert gas into the solvent adsorbing device 101 during the vacuum step the partial pressure of solvent is reduced, in particular in the second side B of the activated carbon bed 102, and the solvent is removed from the activated carbon bed 102, in particular from the first side A of the activated carbon bed 102. The inert gas, is delivered from an inert gas source 103 to the solvent adsorbing device 101, through conduits 104, 119 and 120, so that a gaseous mixture of solvent and inert gas is removed from the solvent adsorbing device 101. According to embodiments, conduit 120 may be provided with a plurality of nozzles, so that the inert gas is released homogeneously and uniformly into the solvent adsorbing device 101.

The vacuum pump 122 is connected to the ejector 123 through conduit 124, and the ejector 123 is connected to conduit 124, with its "suction area"; in other words, the inert gas (e.g., nitrogen) containing the solvent desorbed from the activated carbons is aspired by the ejector 123 and transferred, through conduit 130, to the solvent recovery column 125, wherein the fluid exiting the ejector 123 is cooled, and the gaseous solvent is condensed into a liquid.

Such cooled, liquefied, recovered solvent, may be re-used as motive fluid in the ejector 123. In particular, the recovered solvent exits from the solvent recovery column 125, and is delivered to pump 126 through conduit 127. The solvent may be delivered to the ejector 123 to be used as motive fluid, through conduit 129. In other words, pump 126 delivers the recovered solvent, after it has been condensed. The ejector 123, when the recovered solvent is used as motive fluid, acts also as mixer by mixing the condensed solvent, which enters into the ejector 123 through conduit 129, with the solvent-containing inert gas that is aspired by the ejector 123 through conduit 124. The mixture of condensed solvent and solvent containing inert gas enters in the solvent recovery column 125 through conduit 130.

According to the embodiment of FIG. 4, an additional heat exchanger 135 may be used to further decrease the temperature of the liquefied solvent exiting from the solvent recovery column 125. In this case, the condensed solvent exiting from the solvent recovery column 125 is delivered to pump 126 through conduit 127, and then delivered to the heat exchanger 135, wherein the temperature of the condensed solvent is further decreased by thermal exchange with a refrigerating fluid (e.g. cold water), which is delivered from chiller 131 to the heat exchanger 135 through conduit 132. The refrigerating fluid exiting the heat exchanger 135 is delivered back to the chiller 131 through conduit 133. The condensed solvent exiting from the heat exchanger 135, may be delivered to the ejector 123, through conduit 129, to be re-used as motive fluid in the ejector 123. Optionally, a part of the condensed solvent exiting from the heat exchanger 135, may be delivered to column 125, through conduit 134.

According to embodiments, when the solvent is delivered through conduit 134, which is preferably provided with a plurality of nozzles 128, it is released into column 125 from conduit 134 in the form of a cold feed of solvent, preferably at a temperature ranging from 3° C. to 8° C., more preferably ranging from 5° C. to 6° C. This recycling of the recovered solvent into column 125 provides for a fast and effective cooling of the solvent coming from the ejector 123, and entering the solvent recovery column 125 through conduit 130.

When the temperature of the solvent-containing inert gas is decreased to a temperature that is lower than the boiling temperature of the solvent, for example when the solvent-containing inert gas enters into the ejector 123, the condensation of the solvent occurs, so that the solvent is separated from the inert gas.

After the solvent has been condensed, i.e., recovered, it is delivered to a solvent outlet 136. In the case that the solvent is not miscible in water, the water that may be present in the circuit is separated from the solvent and delivered to a water outlet 137.

Once the required amount of solvent has been removed from the activated carbon, so that the solvent has been recovered and the activated carbon have been regenerated, the bed of activated carbon is cooled to a temperature suitable for the solvent adsorbing step.

As above discussed with reference to FIG. 4, an inert gas flow (e.g., a nitrogen flow) is provided into the solvent adsorbing device 101 during the vacuum step.

At the end of vacuum step, a flow of inert gas, e.g., nitrogen, is used to restore the pressure required to carry out the following cooling step.

Figure 5:
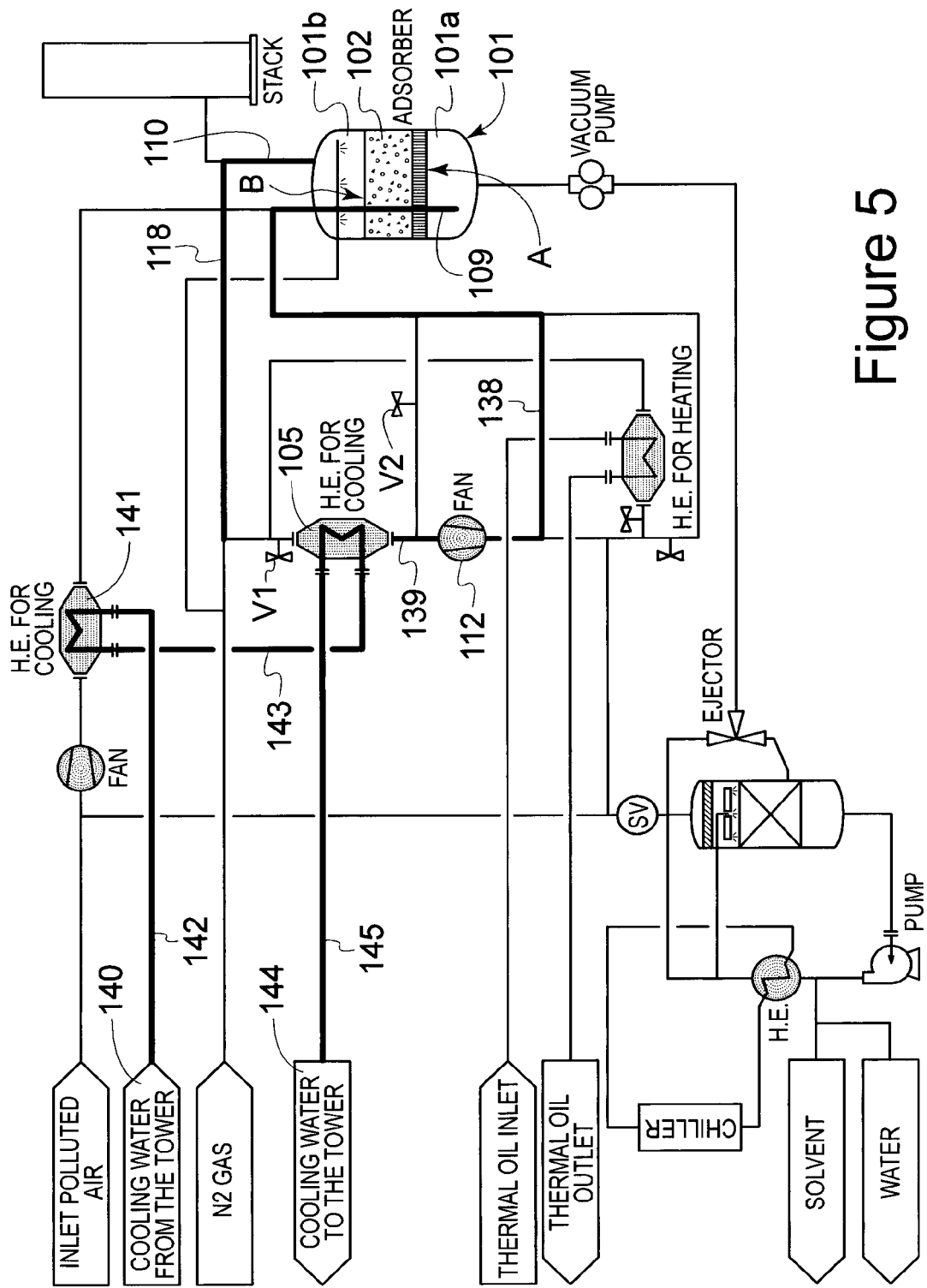
FIG. 5 is a schematic representation of the process flow during the step of cooling of the activated carbon.

FIG. 5 refers to the step of cooling of the activated carbon, which precedes the new solvent adsorbing step, wherein the regenerated activated carbon will be contacted with a new flow of polluted air, i.e., solvent containing air, to be purified.

FIG. 5 shows the flow path of the fluids between the different components of the plant according to the embodiment of FIG. 5, during the step of cooling of the activated carbon. According to the embodiment of FIG. 5, the inert gas in the solvent adsorbing device 101, is delivered, through conduits 110 and 118, to the heat exchanger 105 for cooling, by means of a fan 112, that is connected to heat exchanger 105 through conduit 139.

Inert gas passing through the heat exchanger 105 is cooled to a temperature ranging from 50° C. to 20° C., preferably ranging from 40° C. to 30° C. The cooling of the inert gas is made by means of the heat exchanger 105 which is, in turn, fed with a refrigerating fluid, such as cold water. In particular, water from a water source 140 is delivered to a first heat exchanger 141 through conduit 142, and subsequently to the heat exchanger 105 through conduit 143. Inert gas passing through the heat exchanger 105 is cooled to a temperature ranging from 50° C. to 20° C., preferably ranging from 40° C. to 30° C., and is subsequently delivered to the solvent adsorbing device 101, through conduits 138 and 109.

The refrigerating fluid exits from the heat exchanger 105, and it is delivered to a water outlet 144 through conduit 145. As above mentioned, the cold inert gas exiting the heat exchanger 105 is delivered to the solvent absorbing device 101, and enters into the solvent absorbing device 101 through conduit 109. In other words, in the cooling step, the cold inert gas is released into the solvent absorbing device 101 in the same direction of the solvent containing air during the solvent adsorbing step, so that the cold inert gas passes through the bed of activated carbon 102 according to the same direction in which the solvent containing air passes through the bed of activated carbon 102 during the solvent adsorbing step (i.e., the flow of the cold inert gas during the cooling step is "co-current" with respect to the flow of the solvent containing air during the solvent adsorbing step).

For example, according to the embodiment of FIG. 5, the cold inert gas is released into the solvent absorbing device 101, namely in the first portion 101a of the solvent adsorbing device 101, and passes through the bed of activated carbon 102, in this case, in a direction from the first portion 101a (e.g., the lower portion) to the second portion 101b (e.g., the upper portion) of the solvent adsorbing device 101.

Advantageously, when the cold inert gas during the cooling step passes through the bed of activated carbon 102 according to the same direction in which the solvent containing air passes through the bed of activated carbon 102 during the solvent adsorbing step, the moving of potential residual solvent from to the side of the bed where the solvent was concentrated during the heating step to into the body of the bed is substantially avoided. Without being bound to a specific explanation, it is believed that the temperature of the activated carbon of side A of the bed, where the solvent was concentrated during the heating step (e.g. the lower side of the bed) becomes cold, i.e. decreases, before the temperature of the side B of the of the bed (e.g. the upper side of the bed). In this way, the initial cooling of the lower part of the bed is able to fix the residual solvent in the bottom part (side A) of the bed 102. Thus, after the cooling step, activated carbon in the upper part of the bed (side B) results to be cleaner than the activated carbon of the lower part of the bed, i.e. on side A. Similarly to the heating step, also the cooling step is carried out by flowing nitrogen in a closed loop between the bed 102 and a heat exchanger.

The cooling step, above discussed, is continued until the bed of activated carbon reaches a pre-determined temperature, so that the regenerated carbon can receive a new flow of solvent containing air.

Figure 6:
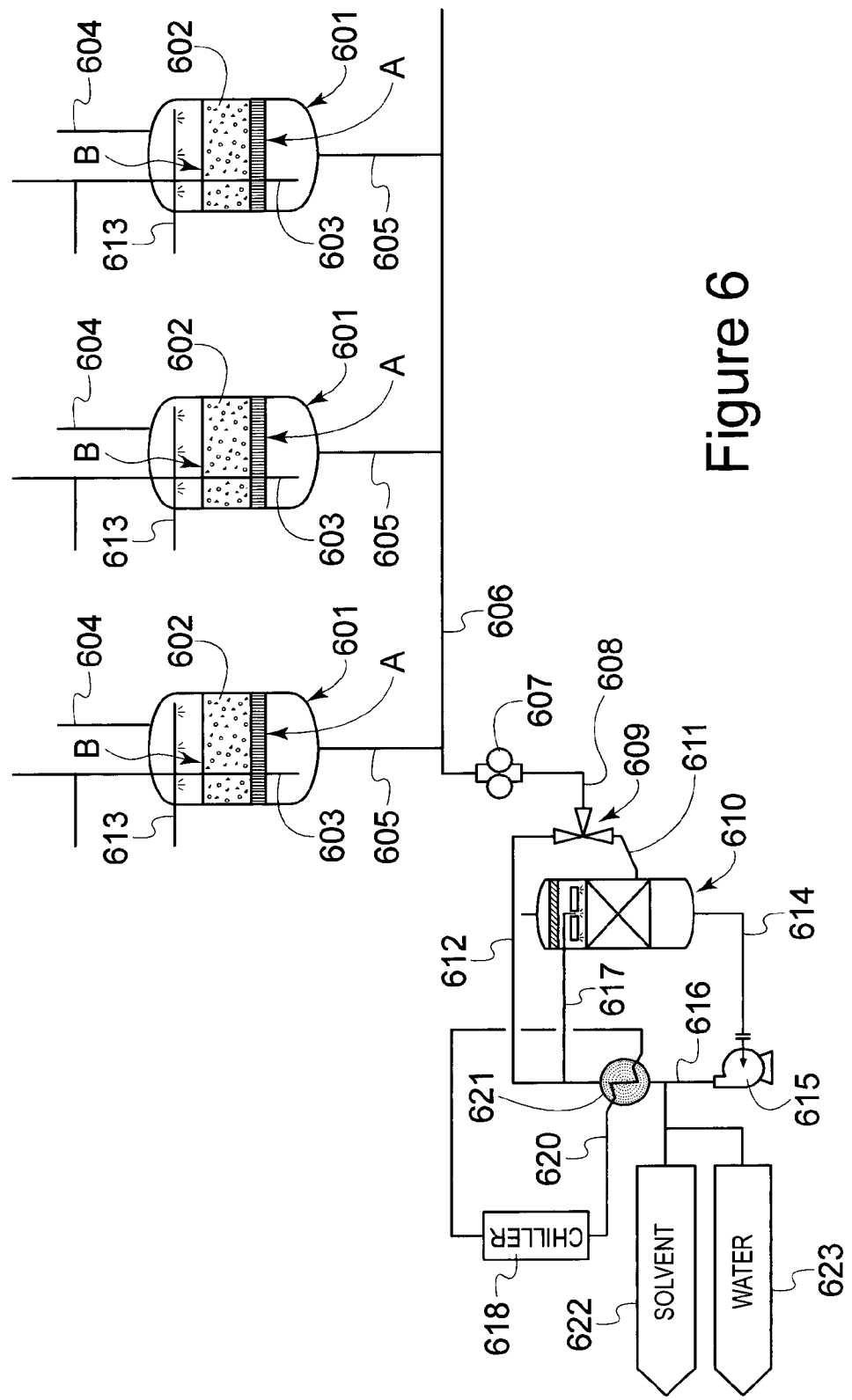
FIG. 6 is a schematic representation of an embodiment of a plant according to the invention, comprising a plurality of adsorbing devices.

FIG. 6 is a schematic representation of an embodiment of a plant according to the invention, comprising a plurality of adsorbing devices, specifically three solvent adsorbing devices. In this embodiment one adsorber is regenerated while at least one of the other adsorbers continue the purification of the solvent containing air arriving from e.g. a printing plant.

Details concerning various aspects and steps of the method of the invention previously discussed with reference to the embodiments of FIGS. 1-5 fully apply, mutatis mutandis, to embodiments comprising more than one solvent adsorbing device, such as the embodiment of FIG. 6, which comprises 3 solvent adsorbing devices. The functioning is the same as for the above discussed embodiment.

According to the embodiment of FIG. 6, three solvent adsorbing devices 601 are each one provided with an activated carbon bed 602. Each one of the solvent adsorbing devices 601 is provided with a conduit 603, which enters into the solvent adsorbing devices 601 and passes through the activated carbon bed 602. Conduits 603 deliver to the solvent adsorbing devices the air to be purified during the adsorbing step, the inert gas during the oxygen removing step and the cooled inert gas during the cooling step. Accordingly, the purified air, the inert gas during the oxygen removing step and the cooled inert gas during the cooling step, pass (in different steps of the process) through the activated carbon beds 602 and exit from the solvent adsorbing devices 601 through conduits 604.

Conversely, during the heating step, the heated inert gas enters into the solvent adsorbing devices 601 through conduits 604, passes through the activated carbon beds 602 and exits from devices 601 through conduits 603.

Advantageously, when one of the solvent adsorbing devices is undergoing a regeneration step according to the method of the invention, at least one of the remaining solvent adsorbing devices may be used to perform adsorbing step, i.e., the treatment of the polluted air, to adsorb the solvent from the polluted air into the activated carbon.

As above discussed above with reference to the embodiment of FIG. 4, during the vacuum step, a reduced pressure $P_{red}$ is applied to the bed of activated carbon 602, previously heated, to remove at least part of the solvent from the carbon bed by means of a reduced pressure source (e.g., a vacuum group), comprising, according to the embodiment of FIG. 6, a vacuum pump 607, connected to an ejector 609 through conduit 608.

In the embodiment of FIG. 6, the solvent extracted from the activated carbon bed 602, exits from the solvent adsorbing device 601 through conduit 605; each conduit 605 is connected to a duct 606 which is in turn connected to a source of reduced pressure, namely a vacuum pump, 607. The solvent is delivered to the vacuum pump 607 through conduit 606.

As in the above discussed embodiment, in the vacuum step, a reduced flow of inert gas (e.g., a nitrogen flow) is fed into the solvent adsorbing device 601 that is being regenerated, to push the solvent released from carbon through bed 602 into conduit 605. The inert gas, is delivered to devices 601, through conduits 613, which are provided with a plurality of nozzles.

The solvent desorbed from the activated carbons is fed by the pump 607 to ejector 609 and transferred, through conduit 611, to the solvent recovery column 610, wherein the fluid exiting the ejector is cooled, and the gaseous solvent is condensed into a liquid.

As above discussed with reference to FIG. 4, the cooled, liquefied, recovered solvent, may be delivered to the ejector 609 to be used as motive fluid, through conduit 612. Pump 615, which is connected to the solvent recovery column 610 through conduit 614, delivers the recovered solvent, after it has been condensed, and re-circulate it through conduits 616, 612 and 617.

A heat exchanger 621 is provided to further decrease the temperature of the liquefied solvent exiting from column 610. Heat exchanger 621 is connected to chiller 618 through conduit 620. The solvent is recovered through a solvent outlet 622; any water that has separated from the solvent is delivered to a water outlet 623.

As above discussed, during a solvent adsorbing step, a flow of air that contains solvent is passed through activated carbon, so that the solvent contained in the air is adsorbed on said activated carbon.

For example, a flow of air may have a solvent content ranging from 4 to 8 g/Nm$^3$, i.e., a from 4 to 8 g of solvent per cubic meter of air at standard conditions (0° C. and 100 kPa). A solvent as here discussed, may be a mixture comprising a plurality of components; for example it may comprise an alcohol in an amount ranging from 75% to 85% by weight, ethyl acetate in an amount ranging from 10% to 15% by weight, and a retardant (high boiling compound) in an amount ranging from 5% to 10% by weight. For example, a "solvent" may comprise an alcohol in an amount of 80% by weight, ethyl acetate in an amount of 15% by weight, and a retardant in an amount of 5% by weight of the total solvent composition.

In the process of the invention, independently of the number of adsorbers, the flow rate of air containing the solvent to be purified typically may be 12000 Nm$^3$/h with a solvent content ranging from 4 to 8 g/Nm$^3$.

A suitable solvent adsorbing device 101 or 601 may have a diameter of 2.5 m. The bed of activated carbon may have a height, i.e., a "thickness", of more than 1.5 m, and may have an activated carbon content of about 4000 kg. Suitable activated carbon are known in the art; in a preferred embodiment, the activated carbon has a particle size ranging from 3 to 4.6 mm, the particle size is measured according to the standard method ASTM D2862. Suitable activated carbon may have a BET-Surface ranging from 1050 to 1300 m$^2$/g, wherein the BET-Surface is measured according to the standard method ASTM 3663. For example, a suitable activated carbon is the activated carbon having commercial name Supersorbon® k42 from DONAU CARBON GmbH.

In a preferred embodiment of the invention, the air solvent content is reduced to an amount ranging from 75 mg/Nm$^3$ to less than 10 mg/Nm$^3$, preferably to an amount lower than 10 mg/Nm$^3$. The purified air is also substantially free of moisture; in possible embodiments, at least part of the purified air is delivered back to the printing plant.

The above discussed method provides the regeneration of the activated carbon, which results in the restoring of the adsorbing capacity of the activated carbon, which results to be ready to be operated into a "new" solvent adsorbing step. The method also provides for an effective recovery of the solvent, from the activated carbon, so that it can be re-used, for example in industrial printing processes.

The invention claimed is:

1. A method of regenerating activated carbon in a solvent adsorbing device (101), said carbon containing a solvent that was adsorbed on said activated carbon in solvent adsorbing step in which a flow of air that contains solvent is passed through said carbon, said method comprising the steps of:
   i) heating said activated carbon, said heating being carried out at least in part by a flow of heated inert gas;
   ii) applying a reduced pressure Pred to the heated carbon in said device to remove at least part of said solvent from said activated carbon;

iii) recovering the solvent;
wherein during said heating step i),
- a. said heated inert gas is circulated from said activated carbon to at least one heat exchanger (107) to increase the gas temperature to temperature T1 and from said heat exchanger to said activated carbon (102) to increase the temperature of the carbon, at least some of said activated carbon having temperature T2, wherein T1>T2,
- b. the temperature T2 of at least part of said activated carbon is lower than the boiling point of said solvent at the pressure P present in said activated carbon adsorbing device, whereby no solvent is recovered in step i).

2. The method of claim 1, wherein in said step of solvent adsorption, said solvent-containing air is passed through a bed (102) of said activated carbon along a first direction, from a first side (A) to a second side (B) of said bed (102), and wherein in said heating step said heated inert gas is passed through said carbon (102) along a second direction from said second side (B) to said first side (A), said second direction being opposite to said first direction.

3. The method of claim 2, wherein at least during said heating step i) the temperature of said at said first side (A) of the bed is lower than the temperature at the second side (B) of the bed.

4. The method of claim 3, wherein said flow of heated inert gas concentrates the adsorbed solvent from said second side (B) towards said first side (A) of said bed (102) of activated carbon.

5. The method of claim 4, wherein said reduced pressure according to step ii) is applied to the said first side (A) of said bed (102).

6. The method of claim 2, wherein inert gas is fed to solvent adsorbing device (101) during said step ii), whereby a gaseous mixture of solvent and inert gas is removed from said device.

7. The method of claim 1, wherein said reduced pressure is generated by a pump in combination with at least a second device for producing a reduced pressure.

8. The method of claim 7, wherein said at least second device is an ejector.

9. The method of claim 8, wherein solvent is liquefied and fed to said ejector.

10. The method according to claim 1, further comprising a step of cooling the activated carbon, wherein at least one cooled inert gas is passed through said activated carbon, along a direction from said first side (A) of the activated carbon bed, to said second side (B), said direction being opposite to the direction of said heated inert gas according to claim 2.

11. A process for recovering solvent from process air by adsorbing solvent on activated carbon, characterized in comprising a step of regenerating activated carbon according to the method of claim 1.

* * * * *